United States Patent [19]

Lemelson

[11] 4,120,930

[45] Oct. 17, 1978

[54] METHOD OF COATING A COMPOSITE MOLD

[76] Inventor: Jerome H. Lemelson, 85 Rector St., Metuchen, N.J. 08840

[21] Appl. No.: 719,807

[22] Filed: Sep. 2, 1976

Related U.S. Application Data

[63] Continuation of Ser. No. 495,793, Aug. 8, 1974, abandoned, Continuation-in-part of Ser. No. 300,299, Oct. 24, 1972, Pat. No. 3,827,667, which is a continuation of Ser. No. 53,833, Jul. 10, 1970, abandoned, which is a continuation-in-part of Ser. No. 601,259, Nov. 1, 1966, Pat. No. 3,529,987, which is a continuation-in-part of Ser. No. 432,033, Nov. 25, 1964, Pat. No. 3,414,863, and Ser. No. 432,924, Jan. 8, 1965, Pat. No. 3,346,220.

[51] Int. Cl.² .................... B29C 1/02; B29C 1/04; B28B 7/36; B22B 9/00
[52] U.S. Cl. .................... 264/225; 249/114 R; 264/219; 264/337; 264/338; 427/133; 427/135
[58] Field of Search ............... 264/219, 225, 338, 337; 249/114; 427/133, 135

[56] References Cited

U.S. PATENT DOCUMENTS

| | | | |
|---|---|---|---|
| 2,317,597 | 4/1943 | Ford et al. | 425/175 |
| 2,903,375 | 9/1959 | Perot | 427/135 |
| 3,059,295 | 10/1962 | Vossknehler | 427/133 |
| 3,673,293 | 6/1972 | Teague | 264/225 |
| 3,684,004 | 8/1972 | Germain et al. | 427/133 |
| 3,734,449 | 5/1973 | Itou et al. | 264/338 |
| 3,779,816 | 12/1973 | Mao | 427/135 |
| 3,865,608 | 2/1975 | Borbely | 427/135 |

*Primary Examiner*—James B. Lowe

[57] ABSTRACT

A method of molding wherein a mold for shaping a material to be molded is formed by casting a first mold base portion formed of a bulk material such as Portland cement, carbon, graphite or castable ceramic material and the like to define a mold cavity, and coating the mold cavity with a first metallic layer. Upon the metallic first layer, there is deposited a second hard surface layer formed of a material such as the carbides, nitrides, and oxides of tungsten, titanium, boron, silicon and aluminum.

1 Claim, 11 Drawing Figures

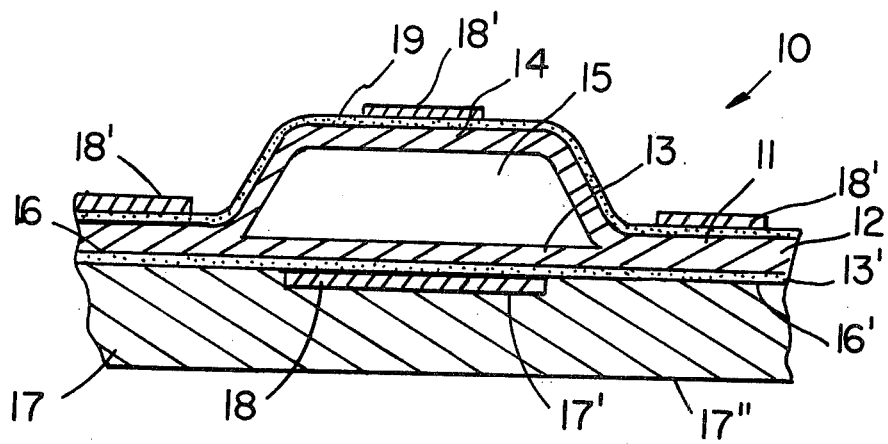
FIG. 1
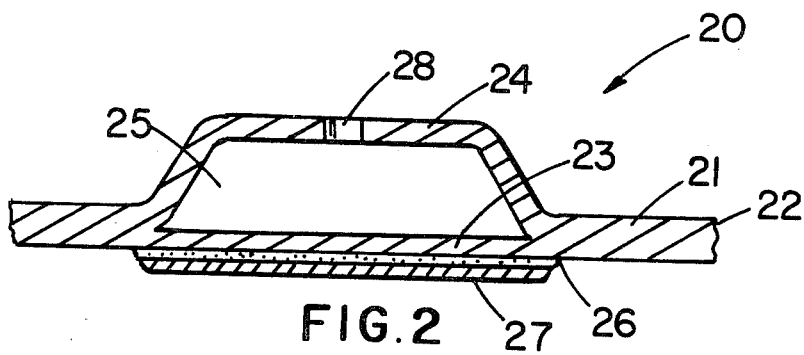
FIG. 2
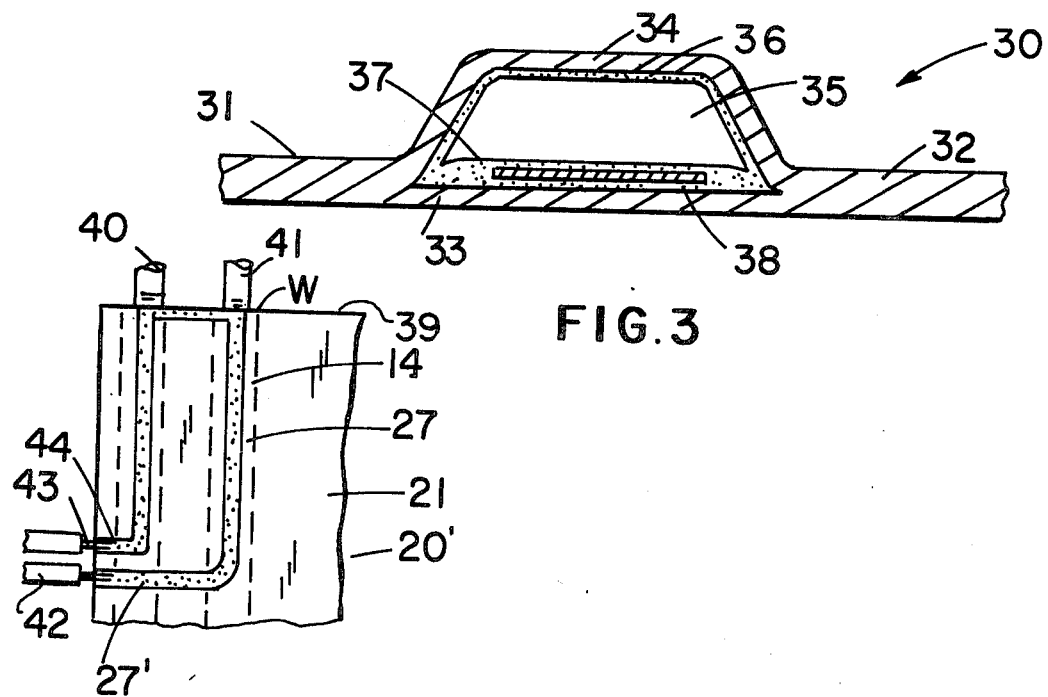
FIG. 3
FIG. 4

METHOD OF COATING A COMPOSITE MOLD

RELATED APPLICATIONS

This is a continuation application of application Ser. No. 495,793 filed Aug. 8, 1974 for Composite Structure, now abandoned.

OTHER REFERENCE APPLICATIONS

Application Ser. No. 495,793 was a continuation-in-part of application Ser. No. 300,299, filed Oct. 24, 1972, for Composite Mold Wall Structure, now U.S. Pat. 3,827,667, and said application Serial No. 300,299 was a continuation of Serial No. 53,833, filed July 10, 1970, now abandoned, and which was a continuation-in-part of Ser. No. 601,259 filed Nov. 1, 1966, now U.S. Pat. No. 3,529,987, a continuation-in-part of Ser. No. 432,033, filed Nov. 25, 1964, now U.S. Pat. No. 3,414,863 and Ser. No. 432,924 filed Jan. 8, 1965, now U.S. Pat. No. 3,346,220. The parent application for the foregoing applications was application Ser. No. 641,101, filed Feb. 19, 1957, now U.S. Pat. No. 3,173,195.

SUMMARY OF THE INVENTION

This invention relates to new and improved constructions in mold walls. The invention is also concerned with improved methods for producing such mold structures.

Metal and ceramic panels have been utilized as components for various structures such as the walls of molds, ovens and other enclosures including the bodies of vehicles and equipment exposed to ambient extreme changes or variations in temperature. Most of the panel structures of the prior art utilized for heat transfer purposes are relatively complex assemblies requiring many fabricating operations and hence, are relatively costly to fabricate and difficult to maintain.

The composite structures defined by the instant invention are produced, at least in part, by depositing one or more materials, including insulating materials, on a substrate to form portions of the composite structure which may serve as insulation and/or the major support therefore. By employing the techniques defined herein, substantial reductions may be realized in the cost of producing such structures, as well as improvements in the structures themselves. Accordingly, it is a primary object of this invention to provide a new and improved composite mold structure and a method for producing same.

Another object is to provide a new and improved mold having a plurality of wall components including a relatively thin sheet of metal operative to receive the heat of the process secured to a substantially thicker wall material or substrate which is relatively inexpensive and easy to combine with said metal.

Another object is to provide a mold structure, the major portion of which is made of a non-metallic material such as a ceramic or mortar yet which may be utilized to rapidly dissipate heat applied to a metallic portion thereof.

Another object is to provide a new and improved method for fabricating composite molds applicable for use in environments of extreme temperatures.

With the above and such other objects in view which may hereafter more fully appear, the invention consists of the novel constructions, combinations and arrangements of parts as will be fully described and illustrated in the accompanying drawings but it is to be understood that changes, variations and modifications may be restored to which fall within the scope of the invention as claimed.

In the drawings:

FIG. 1 is a fragmentary view in cross-section of a portion of a composite, heat transfer panel or mold containing features of the invention;

FIG. 2 is a fragmentary view in cross-section of another form of composite heat transfer panel or mold wall;

FIG. 3 is a fragmentary view in cross-section of another form of heat transfer panel, mold or container wall made in accordance with the teachings of the instant invention;

FIG. 4 is an end cross-sectional view of a mold adapted to contain heat transfer conduits adjacent the walls of the molding cavity, the structure being shown during the initial stage of fabrication of the mold.

FIGS. 1–3 illustrate additional composite material structures applicable in the construction of a variety of machines wherein rapid heat transfer is desired between a wall such as a wall of a mold, furnace or other device and a medium disposed immediately adjacent thereto.

Figure 5:
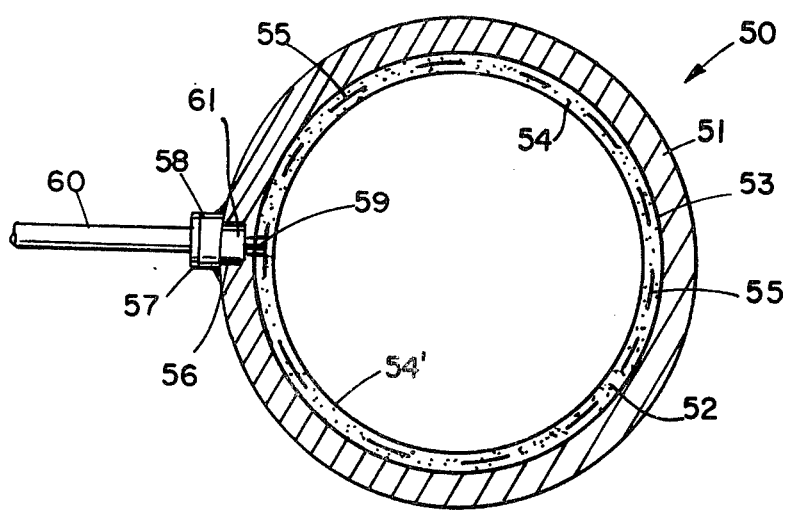
FIG. 5 is an end cross-sectional view of the mold of FIG. 4 after fabrication thereof has been substantially completed.
Figure 6:
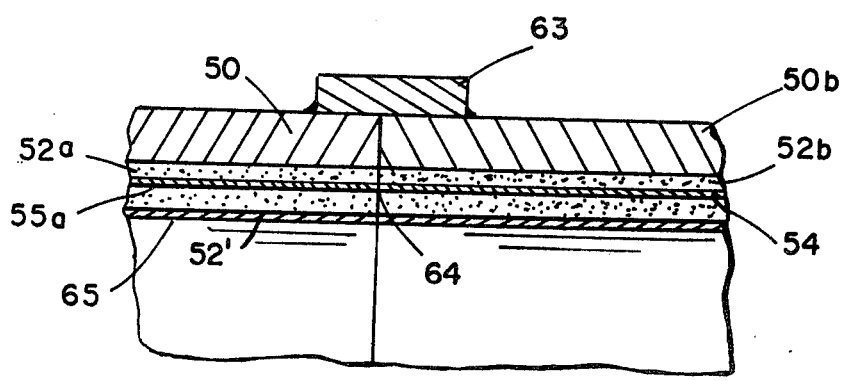

The composite structure 70 of FIG. 1 defines a wall of a furnace, mold or other device composed of a base 71, preferably made of a plastic ceramic or mortar material which has been cast, extruded or otherwise formed to shape having an inner surface 72 and an outer surface 73. Notation 69 refers to a frame or otherwise shaped support for the composite structure 70 which may be secured with fasteners or other means to the surface 72. Secured to and in abutment with the surface 73 of the base 71 is a sheet 76 of metal having a vein-like conduit formation 78 extending from the main portion or base 77 of said sheet. The conduit portion 78 contains a wall 78' which protrudes into a channel 74 formed in the surface 72 of base formation 71. The surface of wall 78' of ducted sheet 76 perfectly abuts the surface 75 of the channel 74 formed in surface 72 of base 71. Notation 78 refers to a passageway extending through the sheet 76 through which passageway a heat transfer fluid may be conducted for either heating the sheet 76 to transfer heat to the material disposed against its outer surface or for cooling same to rapidly dissipate heat conducted thereto by, for example, a working medium or molding material. The material forming base 71 may be cast in situ against the surface of sheet 76 or may be preformed and laminated or adhesively bonded to sheet 76.

In one form of the invention illustrated in FIG. 1 the sheet 76 may be made of aluminum, copper, nickel, nickel alloys or titanium while the material comprising base 71 may be composed of portland cement, ceramic material, carbon, pyrolytic graphite or other material having sufficient strength to support the structure under the expected operating conditions.

In certain applications, the base 71 may also be made of solid cellular materials such as cellular ceramics, metals or plastic resins which are cast or otherwise provided in situ against the sheet 76.

In FIG. 2 is shown a structure in the heat transfer panel or container wall which is somewhat similar to the structure of FIG. 1 but is produced by a fabricating technique which is quite different from that illustrated in FIG. 1. The composite structure 80 is composed of a base 81 which is preferably made of a ceramic material such as a cold-setting portland cement or other suitable, relatively low-cost ceramic material which has been cast to shape having an inner surface 82 containing a plurality of channels 84 extending in a circuit about said inner surface to form a heat transfer fluid conducting passageway or network throughout the inside surface of the panel or mold. The outer surface 83 of the compsoite wall 80 is shown secured to members of a frame 69, wall or otherwise shaped support therefore.

The composite structure 80 of FIG. 2 is formed by first casting or otherwise shaping the base portion 81 forming the major portion of said structure and thereafter disposing a first layer 87 of a lining material 86 such as metal against the inside surface 82 of the material defining base 81. If the lining material 86 is composed of metal, it may be sprayed, vacuum deposited, electrodeposited from a solution or deposited by a suitable electroless metallizing technique.

The first layer 87 of the coating material 86 may be deposited at thickness varying from several thousandths of an inch to 1/16 inch or greater. After it has been deposited, the remaining volumes defining the channels 85 and the coated surface are filled with a material such as wax, lead or other material denoted 89 having a lower melting point than that comprising deposited coating layer 86 and a second layer 87' of the same material comprising layer 87 is deposited, preferably in the same manner in which the first layer was deposited, across the outer surface of the first layer and the surface of the material 89 filling the volume 85'. The second deposited layer 87' therefore becomes integral with the first deposited layer 87 of coating material 86 and provides passageways 75 between the first and second deposited layers which may be cleared of the filler material 89 by melting or dissolving said filler material and causing it to flow out of the confining volume or volumes 85'.

In the structure illustrated in FIG. 1, the shape of the conduit 78 of the composite material is restricted to that shape which the ducted sheet 76 may be pressed or otherwise formed. In this connection, the sheet 76 may be disposed against an irregular outer surface 72 of the base 71 and deformed by the application of fluid pressure to its outer surface 77 to conform to the surface 72.

In the structure illustrated in FIG. 2, the inner surface 82 of the base 81 may be any configuration, as cast or molded, and, since the coating material 86 is deposited by spraying or from the solution, it will naturally conform to the surface on which it is deposited.

In FIG. 3, a composite structure 90 is illustrated which is a modified form of the structures illustrated in FIGS. 1 and 2. The composite 90 is composed of a base 91 which is cast molded or extruded to shape as described and is preferably made of the materials described herein. The inner surface 92 of base 91 is formed with a continuous channel 94 or network of channels which eventually form part of the heat transfer fluid system.

After forming base 91, and supporting its rear face 93 by means of a frame 69 or wall, as described, the channel or channels 94 are filled with a wax 89 to a depth such that, upon applying a coating material 95 to the surface 92 and the outer surface of the wax 89, said coating material will be properly configured with its inside surface 96 having a desired shape or contour. The coating material 95 is applied, as described, by spraying, electrolytically or electroless deposition of metal thereon to a desired depth. After the coating material is so deposited, the way 89 filling the cavity 94 is heated by applying heat to the composite structure and is caused to flow out of the passageway providing a structure composed of a bulk material defining the main base 91 having a metal liner 92 and a passageway 94 or network of passageways beneath the inside surface of the coating through which heat transfer fluid may be flowed during the application and use of the composite structure as a furnace, mold wall or heat transfer panel.

Certain variations in the structures illustrated in FIGS. 1–3 and their method of manufacture are noted. While the base portions 71, 81 and 91 have been described as composed of ceramic material such as portland cement, or other suitable ceramic which may be cast to shape in a mold or against a preform, they may also be made of suitable polymers such as high temperature plastics or relatively low cost metal such as aluminum. The coating materials defining layers 76, 86 and 95 are preferably metal of relatively high heat conductivity such as aluminum, copper, nickel, steel or other metal such as titanium, molybednium and tungsten which has been sprayed, electrolytically or electrolessly deposited from a solution, fluidically deformed against the surface of base 91 or otherwise deposited. Said coating material may also comprise powdered metal which is sintereed in situ on the base material or a high-temperature polymer which has been sprayed or otherwise deposited thereon.

The composite structures illustrates in FIGS. 1–3 may be formed in various shapes such as the shape of a flat curved or irregularly surfaced panel, mold wall member or furnace wll member. Accordingly, means are preferably provided for the admission of a heat transfer fluid to the passageway portions and the exiting or out-flow of said fluid therefrom.

In a particular form of the invention, the filler materials disposed within the passageways 85 to 94 of the structures of FIGS. 2 and 3 may be composed of foamed plastic or other suitable material which is volatized by heat or dissolved to remove it from the passageways as described.

In a preferred method of depositing layer of metal to form the structures of FIGS. 2 and 3, aluminum may be deposited by electroless method employing solvated aluminum hydride in a so-called aluminizing process employing titanium tetrachloride to catalyze the reaction. By this technique, solvated aluminum hydride is coated on the surface which is thereafter exposed to the catalyst, or conversely, the catalyst may be first applied followed by application of the aluminum hydride solution. Pure aluminum will deposit on the surface and may be increased in thickness by the alternate application of the aluminum hydride and catalyst until the desired thickness is deposited.

The use of a catalyst as described above to cause aluminum to deposit on a surface may also be applied to form a coating aluminum on the inside of a conduit or pipe heretofore described in this specification. In other words, where it is desired to coat the inside of a tube, pipe or tubed sheet conduit, made of metal, plastic, ceramic, glass or other material with aluminum of a desired thickness, the described titanium chloride catalyst and aluminum hydride may be alternately flowed through said conduit to build up an aluminum layer on the inside surface thereof as a plurality of incremental layers which deposit one on the other until the desired thickness is deposited.

Figure 10:
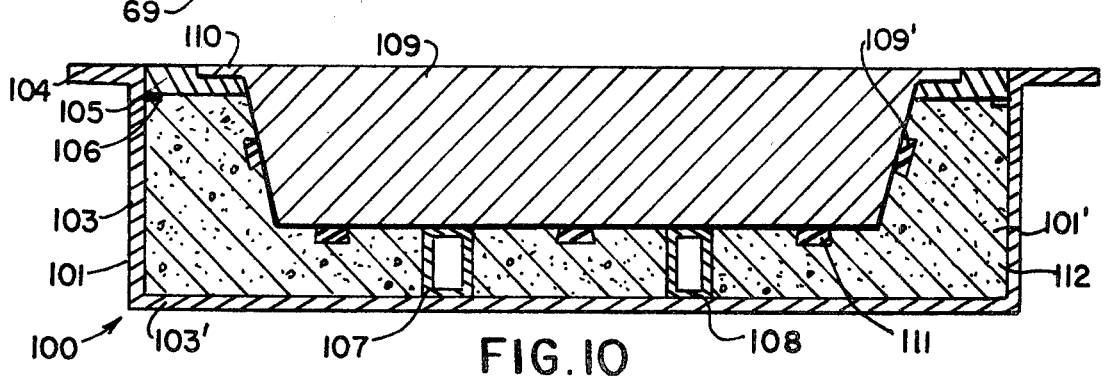
Figure 11:
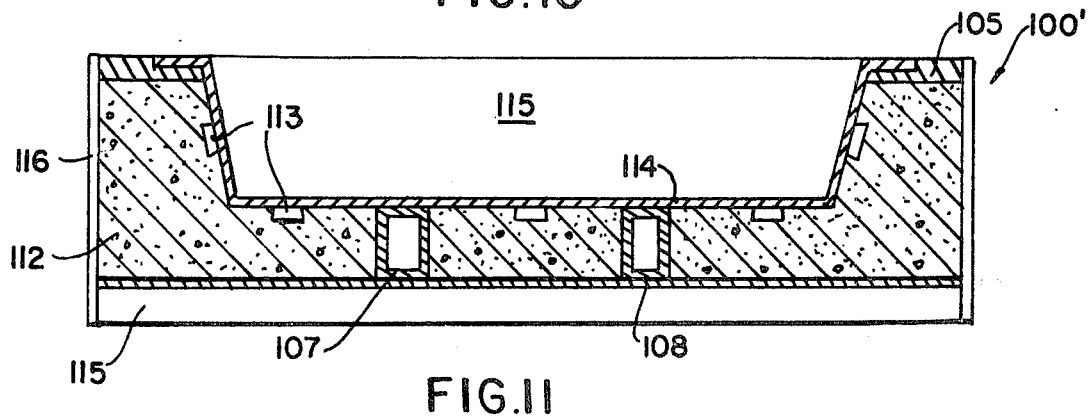

FIGS. 4 and 5 show steps in the fabrication of a modified type of mold within the purview of this invention. In FIG. 10, a molding assembly 100 is composed of a flanged container 101 made of sheet metal, plastic or other suitable material having a mold form or pattern 109 retained in the central portion of the volume 101' defined by the container 101. The container 101 has a circumscribing side wall or walls denoted 103, a flange 104 at the upper end of the side wall and a bottom wall 103' forming a cavity in which a suitable casting material such as portland cement, concrete, ceramic or other material may be cast about the form 109 which defines, in part, the shape of the molding cavity to be formed. The pattern 109 may be sculptured of wood, plastic, metal or other material and is shown supported by box beams 107 and 108 resting on the bottom wall 103' and by a ring or frame 105 secured by pins 106 which project inwardly from the side walls 103 of the container. The ring 105 supports a flanged portion 110 of the form 109 and centers said form within the container 101 so that casting material 112 may be cast about said form as shown.

The hereinbefore described heat transfer fluid passageways are formed by applying strips 111 of low temperature melting material such as wax to the exterior surface of the pattern or form 109 and bonding said strips in the desired passageway configurations thereto. The strips may be dovetailed in shape as shown so that they will remain in the cast material 112 when the form 109 is removed therefrom after the cast material has set. Thereafter, a suitable lining material 114 such as metal or high temperature plastic or ceramic is deposited against the inside surface of the cast material 112 and the strips 111 by casting, spraying, electro-deposition or electroless deposition in the desired thickness to form a lining defining the molding surface as described. The meltable material 111 filling the cavities or passageways 113 defined between material 112 and lining 114 may be removed by applying a heated fluid to the cavity 115 of the mold so formed and causing the flow of the molten material 111 by applying air under pressure to the end or ends of the passageways 113 to cause said material 111 to be forced out of said passageways. Thereafter the ends of the passageways 113 are connected by suitable fittings and lines to a source of heat transfer fluid including a pump or other means for pressurizing and causing same to flow through the mold, preferably under automatic control during a molding operation.

When the casting material 112 has completely set, and the lining 114 has been applied, the composite structure may be removed from the mold or container 101 and placed in a supporting frame or may be retained in the container 101 as illustrated in FIG. 4 which may be used per se or attached to further means for holding and/or manipulating the assembly during a molding operation. Suitable mold release means may be applied to the outer surface of mold pattern or form 109 during the casting of the mold. If precise dimensioning is required, the shape of the surface 109' of the form 109 is greater in dimensions than the shape of the article to be molded in the completed mold 100' by the thickness of the lining 114 so that the molding cavity 115 will have the precise desired shape after the suitable lining 114 has been provided.

The strips 111 of meltable material may be attached to the surface of the mold form 109 by a suitable adhesive during the casting of the mold. In addition to being made of a suitable wax, the material forming strips 111 may also be made of a low-temperature melting fixturing material such as Rigidax tooling compound manufactured bu the M. Argueso Company, Inc. of Mamaroneck, N.Y.

The cast filler materials denoted 71, 81, 91 and 112 in the structures shown in FIGS. 1 to 5 may comprise, as hereinbefore set forth, any suitable relatively low cost material as compared to mold forming metals such as portland cement, various mortars, ceramics and the like. In certain instances, said cast materials may comprise rigid cellular plastics which have been poured into the mold or preform and foamed in situ against the ducted sheet or pattern forming the desired shape. The term 'bulk filler material' as set forth in the claims is thus meant to include such materials as Portland cement, various ceramic materials of known composition which are castable, mortars and cellular plastics, mortars and the like, which are capable of supporting the capping sheets illustrated during the molding operations against said capping sheets.

Figures 7, 8:
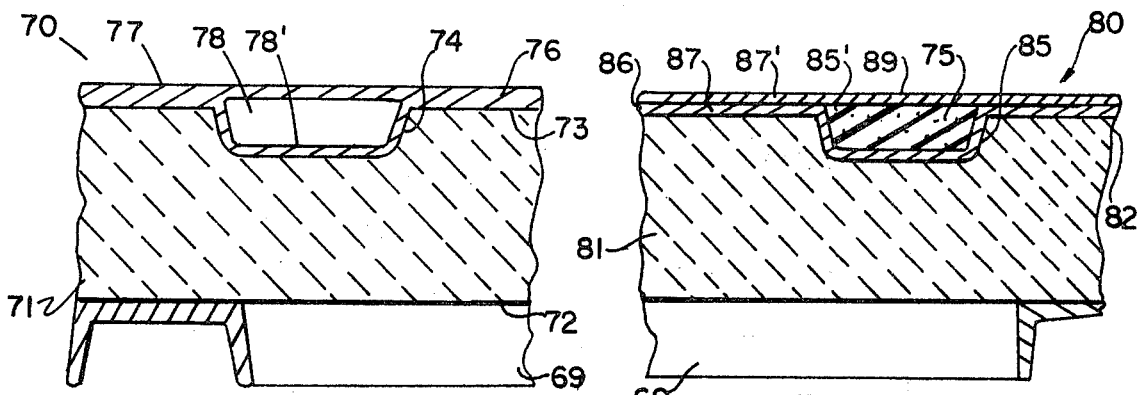
Figure 9:
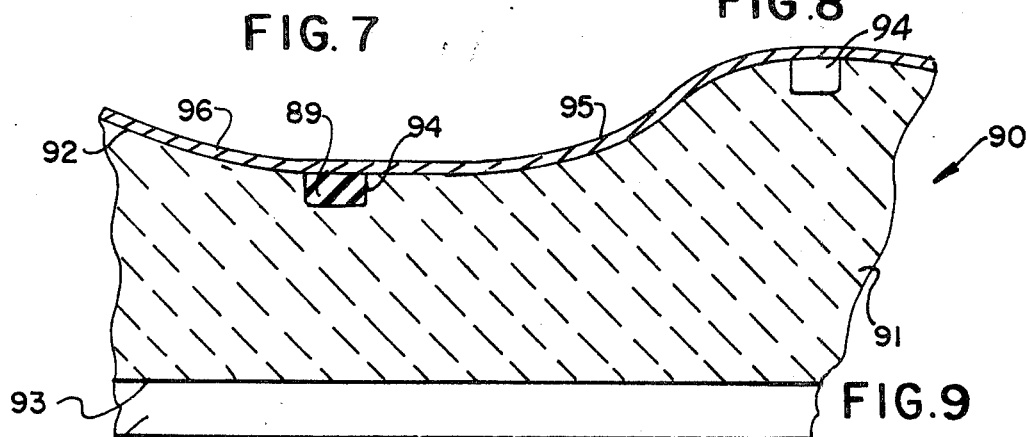

The metal coverings or coatings 76, 86 and 95 of FIGS. 7 to 9 may be subject to a number of structural variations depending on the nature of the molding material to be formed in the mold, the pressures and temperatures employed during molding and the longivity of mold like desired, viz:

(I) The coating on the mold cavity wall may be formed by first depositing a base metal by flame spraying, electro-deposition, electroless deposition, plasma spraying, vapor deposition, sputtering or other means, The base metal may comprise nickle, steel, aluminum, titanium, copper or other suitable metal directly onto the surface of the cast bulk material as cast or after a preliminary finishing operation thereon. One or more layers of the same or a different base metal may be deposited on the first base metal layer by a similar deposition technique or by means of one of the other described deposition method. Such additional depositions may be affected per se of after the surface of the previously effected deposit has been worked or finished by sand blasting, shot peening, machining or other means.

(II) A hard surfaceing material may be finally deposited on the outer surface of the base layer or layers such as a flame sprayed, vapor deposited or sputtered hard surfacing and wear resistent material such as tungsten, tungsten carbide, titanim carbide, boron carbide, boron nitride, silicon carbide, silicon nitride, pyrolitic graphite, aluminum oxide or any of the other suitable hard surfacing materials. Such coatings may be employed per se on the outer surface of the base coating or may be finished as described.

(III) The hard surfacing materials described above may also be deposited by one of the described techniques directly onto the surface of the bulk cast material.

(IV) A high temperature mold for metal and ceramics may be made by casting or otherwise forming the bulk material portion or portions of the mold described of carbon such as pyrolitic graphic to the desired shape and then depositing one or more of the described coating materials on the surface of the mold cavity wall(s) by one or more of the techniques described.

(V) Pyrolitic graphite may also form a first coating or lining on the inside surface of the bulk material described after which one or more of the described coating materials may be deposited thereon as described to form the surface of the mold cavity. If such lining of pyrolitic graphite is machined or cast or spray formed to shape, it may be used as a mold wall against which the bulk material described may be cast to form the mold.

(VI) Pyrolitic graphite may be deposited against the bulk mold formation or a metal coated or otherwise applied thereto to form the inside coating against which molding material is cast or molded.

A material can thus be readily molded into a predetermined shape by producing a mold of the type herein described by casting a mold base 71, 81, or 91 formed of a bulk material such as Portland cement, carbon, pyrolytic graphite, castable ceramic material, mortor, cellular ceramic, or plastic resins which have sufficient strength to support the structure under the expected operating conditions. The mold base is formed so as to have a surface portion thereof define a molding cavity having a predetermined shape.

A first layer or coating of a predetermined thickness is deposited on the surface of the mold cavity, and is bonded thereto. The first layer or coating comprises a metallic layer as for example formed of nickel, steel, aluminum, titanium, copper, or other suitable metal; e.g., molydbemum or tungsten, which may be deposited on the bulk material as hereinbefore described. Pyrolytic graphite may also be used to form the first layer.

A second hard surface layer is formed as a coating onto the first mentioned layer. The hard surface layer is formed of a hard substance, e.g., tungsten, tungsten carbide, titanium carbide, boron carbide, boron nitride, silicon carbides, silicon nitride, pyrolytic graphite, aluminum oxide or any other suitable hard surfacing material.

The mold structure thus formed as described is assembled in a suitable forming machine (not shown) with a second or complementary mold section which also has a surface portion thereof shaped to define a cavity with a cavity portion of the composite mold structure defined.

The material to be molded is thereafter disposed in the cavity thus defined between the respective mold portions or sections.

What is claimed is:

1. A method of molding comprising:
   producing a mold for shaping a material to be molded by
   casting a first mold portion formed of a material selected from the group consisting of: Portland cement, carbon, pyrolytic graphite, castable ceramic material, mortar and plastic resins in a form of a predetermined shape to define a mold base having a first surface portion having a molding cavity formed therein of a predetermined configuration,
   flowing and depositing a first layer of material to form a coating of predetermined thickness onto said first surface portion of said molding cavity and bonding said first layer of material to said surface of said molding cavity whereby said first layer of material is selected from the group consisting of: nickel, steel, aluminum, titanium, coper, molybdenum, tungsten and pyrolytic graphite,
   depositing a second hard surface layer as a coating of predetermined thickness onto said first layer whereby said hard surface layer is selected from the group consisting of the carbides, nitrides, and oxides of tungsten, titanium, boron, silicon, aluminum, and pyrolytic graphite,
   operatively assembling said coated first mold portion in a forming machine with a second complementary mold member having a surface portion thereof, which is shaped to define a cavity between at least a portion of said first surface portion of said first mold portion, and a portion of the surface of said second mold member when the two are so operatively assembled,
   and disposing a material to be molded between said first mold member and said second complementary mold member in said cavity and forming said material to shape there-between by engaging at least a portion of the surface of said second hardened layer so as to shape said moldable material.

* * * * *